Nov. 3, 1953        J. D. RUST        2,657,516
COTTON PICKING SPINDLE ROUGHENING MEANS
Filed April 25, 1950
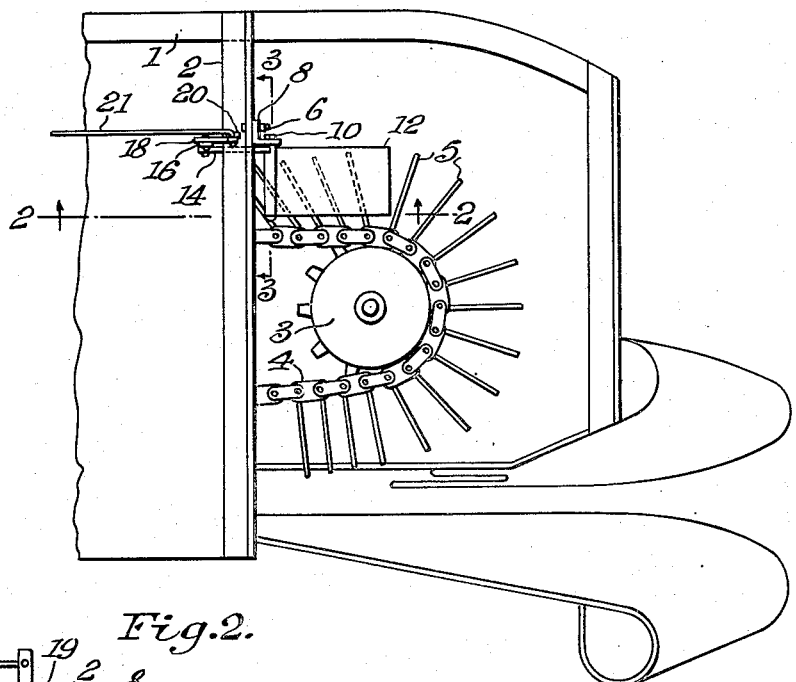
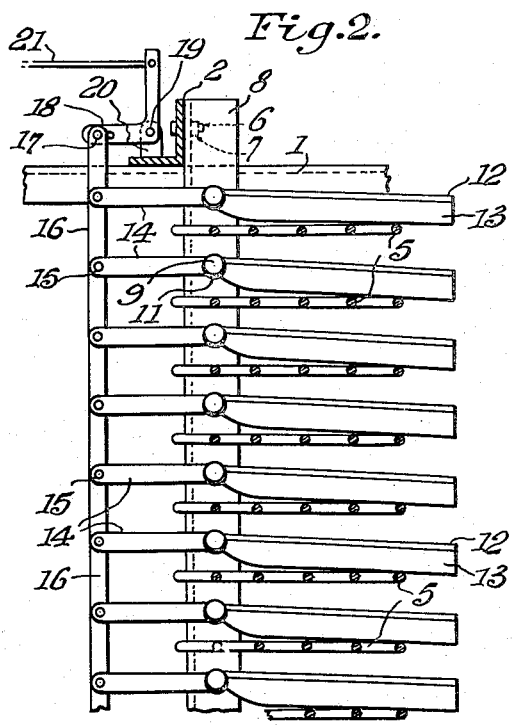
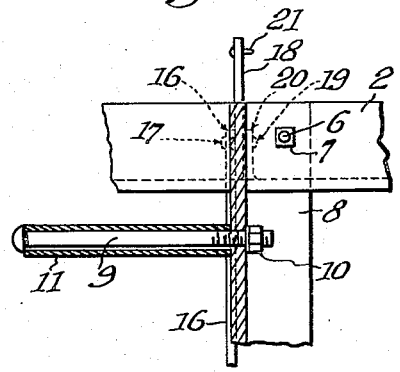
Inventor,
John D. Rust,
By Albert E. Dieterich,
ATTORNEY.

Patented Nov. 3, 1953

2,657,516

UNITED STATES PATENT OFFICE 2,657,516

COTTON PICKING SPINDLE ROUGHENING MEANS

John D. Rust, Pine Bluff, Ark.

Application April 25, 1950, Serial No. 158,038

9 Claims. (Cl. 56—42)

My present invention relates to cotton picking machines, and particularly to mechanism for roughening the spindles of such machines. Spindle roughening devices have heretofore been used, but my present invention has for its object to provide a device that can be readily attached to or removed from cotton picking units, such as shown in Patent 2,085,046.

Another object of the invention is to provide a device whereby a roughening element for each row of spindles is actuated by gravity to contact one spindle at a time, thus avoiding the necessity for using pressure means (such for example as the spring 36 of my Patent No. 2,162,750, or a weight 50 and hydraulic ram 62, 63 device of my Patent No. 2,440,450).

Another object is to provide for each horizontal row of picking spindles, a roughening element secured to a pivotally mounted carrying plate and so positioned that when in operation the free end of the roughing element will drop on each spindle successively, striking one spindle at a time, so that each spindle will be roughened whether it is straight or slightly bent, and regardless of variation of the diameters of the spindles in the row, thus maintaining a slightly roughened surface on all the spindles.

To the attainment of the aforesaid objects and ends invention still further resides in the novel details of construction, combination, and arrangement of parts, all of which will be first fully described in the following detailed description and will then be particularly pointed out in the appended claims, reference being had to the accompanying drawing, in which:

Fig. 1 is a top plan view of so much of a cotton picking unit as is necessary to illustrate the application of my invention thereto.

Fig. 2 is a detail section on an enlarged scale, on the line 2—2 of Fig. 1.

Fig. 3 is a detail section on a further enlarged scale, on the line 3—3 of Fig. 1.

In the drawing, in which like numerals of reference indicate like parts in all the figures, 1 designates the frame of a cotton picking unit which includes a top angle beam 2. It is to be understood that the picking unit also includes a bottom frame and angle beam, not shown, which are similar to the top frame 1 and angle beam 2.

3 designates the driven sprocket over which the chain 4 of the slatted spindle conveyor passes, and 5 designates the spindles.

The foregoing enumerated parts are of known construction and, per se, constitute no part of my present invention.

Mounted in an angle iron post 8, which is rigidly secured to the cross beams 2 (top and bottom) by bolts 6 and nuts 7, is a series of bolts 9 that are threaded into the post 8 and are secured in place by jam nuts 10 (see Fig. 3).

Loosely mounted on the bolts 9 are tubular sleeves 11 having secured thereto in any suitable manner, such as by welding, plates 12, to which are cemented or otherwise suitably secured abrasive blocks 13.

The sleeves 11 have secured thereto in any suitable manner, such as by welding, arms 14 which project from the sleeves 11 in a direction opposite to that of the plates 12 (see Fig. 2). The plates 12 and arms 14 extend from the sleeves 11 on opposite sides thereof and in substantially aligned relation with one another so that the plates 12, sleeves 11 and arms 14 constitute a substantially rigid structure or unit. The arms of the several sleeves 11 are pivotally connected at 15 to a vertical bar 16 that extends upwardly to the top of the cotton picking unit and is pivotally connected at 17 to a bell crank lever 18. The lever 18 is pivoted at 19 on a bracket 20 that is mounted on the top beam 2.

A cable 21 is attached to the bell crank lever by means of which the operator of the machine can rock the bell crank lever to lower the bar 16 and thereby lift the abrasive blocks 13 from contact with the spindles 5.

By reference to Fig. 2 it will be noted that the under face of each block 13 is inclined to the planes in which the horizontal rows of spindles move, so that only one of the spindles is contacted at a time by block 13. The blocks, being actuated by gravity, and being contacted in rapid succession by the spindles, strike the spindles with a hammer-like bouncing blow. This bouncing contact of the abrasive block on the spindle results in a pricking of the spindle surface which is more desirable than the dragging action of the spindles across the abrasives as used in my prior roughener devices. It provides an effective picking surface for the spindle with less wear on the spindles, thus prolonging their life. When some of the spindles in a horizontal row have been worn so that the diameter of the spindles is not uniform, they still will be contacted by the hammer-like bouncing blow of the block 13 because it can freely move up and down to take care of such variations. The several units 11, 12, 13, and 14 are not rigidly connected to the bar 8 but have a certain amount of independent movement with respect to bolts 9. Hence the abrasive members can rise and fall and rock sideways slightly independently of each other and thus contact slightly bent spindles with the hammer-like bouncing blow and thus condition them also.

When it is no longer desired to roughen the spindles, the attendant pulls on the cable 21 and thereby lowers the rod 16, which in turn raises the abrasive blocks from contact with the spindles.

Any suitable means may be used to hold the rougheners clear of the spindles, such for example as a latch device 25, 26 of Patent No. 2,162,750 placed to act on the bell crank lever of this application.

It will be observed from Fig. 1 that my improved roughening device is mounted adjacent the front end of the spindle conveyor toward the outer side of the cotton picking unit, where it is conveniently located for removal or replacement and where the spindles separate as they go around the driven wheel of the conveyor, as this is the location where the most effective results are obtained.

From the foregoing description, taken in connection with the accompanying drawing, it is thought that the construction, operation and advantages of the invention will be clear to those skilled in the art.

What I claim is:

1. In a cotton picking unit having horizontal rows of traveling picking spindles: a spindle roughening device which includes a supporting post, a series of bolts secured to said post, a sleeve loosely mounted on each bolt, an abrasive carrying plate secured to said sleeve, the abrasive of said abrasive carrying plate, when in operating position, being actuated by gravity and positioned to strike one spindle at a time as the spindles pass the roughening device.

2. In a cotton picking unit wherein is provided a spindle slat conveyor having horizontal rows of spindles and means for operating the conveyor: a spindle roughening mechanism comprising a supporting post, a series of bolts detachably secured to said post at vertical intervals corresponding to the spaces between the rows of spindles, sleeves pivotally mounted on said bolts, abrasive-carrying plates secured to a side of said sleeves, arms secured to the other side of said sleeves, the abrasive of each abrasive carrying plate contacting the successive spindles of a row one at a time by gravity, and manually operated means connected to said arms to lift the abrasive from contact with the spindles.

3. In a cotton picking unit having a frame with a spindle slat conveyor for carrying horizontal rows of spindles, and means for operating the conveyor: a spindle roughening mechanism comprising a supporting post, means at one end of said post adapted to detachably mount the post on the frame, a series of bolts detachably secured to said post at vertical intervals corresponding to the spaces between the rows of spindles, sleeves mounted on said bolts, abrasive-carrying plates secured to one side of said sleeves, arms having an end thereof secured to the other side of said sleeves, the abrasive of each abrasive carrying plate contacting one spindle at a time by gravity, a bar pivotally connected to the other end of said arms, and means on said frame pivotally connected to said bar to raise said abrasives from contact with the spindles.

4. In a cotton picking unit wherein a slatted spindle conveyor and means to operate it are provided, said conveyor carrying horizontal rows of spindles: a spindle roughening mechanism having an operative and an inoperative position, said roughening mechanism including a supporting post, a series of plates, each interposed between adjacent rows of picking spindles, abrasive elements secured to said plates, and means loosely pivoting an end of said plates to said post, the pivots being so positioned that the abrasive elements when operative are positioned at an angle to the horizontal by virtue of which only one spindle at a time engages its respective abrasive element.

5. In a cotton picking unit having a frame with a slatted spindle conveyor carrying horizontal rows of picking spindles and means to operate the conveyor: a spindle roughening mechanism which includes a supporting post, a series of plates pivotally mounted at one end thereof to said post, said roughening mechanism having operative and inoperative positions, abrasive elements secured to said plates, there being one abrasive element for each horizontal row of spindles, the pivot point of said plates being positioned on a higher plane than the row of spindles, the abrasive element being inclined downwardly from the pivot and coming into striking contact with each spindle successively by gravity when in operative position as the spindles pass the roughening mechanism, and means connected to said plates to pivotally move the abrasive elements and plates to a nonoperative position, and means on said frame connected to said first named means to retain said plates and abrasive elements in the nonoperative position.

6. A spindle roughening device for use with a cotton picking unit having horizontal rows of traveling picking spindles, said roughening device having operative and inoperative positions, and including a vertical supporting post, a series of roughening elements pivotally mounted on said post, each of said roughening elements comprising a carrying plate having abrasive secured thereto, said abrasive carrying plate when in operative position being actuated by gravity to strike one spindle at a time as each spindle passes a roughening element.

7. A spindle roughening device for use with a cotton picking unit having horizontal rows of traveling picking spindles, said device including a supporting post, a series of bolts detachably secured to said post, a sleeve loosely mounted on each bolt, a plate secured to said sleeve, an abrasive affixed to a portion of said plate, said plate being gravity actuated for moving the abrasive portion of the plate into operative engagement with one spindle at a time.

8. A spindle roughening device for use with a cotton picking unit having horizontal rows of traveling picking spindles, said device including a supporting post, a plurality of spaced bolts detachably secured to said post, a sleeve loosely mounted on each bolt, a plate secured to one side of said sleeve, an abrasive affixed to a portion of said plate, said plate being gravity actuated for moving the abrasive portion of the plate into operative engagement with one spindle at a time, an arm having an end secured to the other side of each of said sleeves, and a bar pivotally connected to the other end of each of said arms for moving said plates from an operative to an inoperative position.

9. A spindle roughening device for use with a cotton picking unit wherein said machine includes a frame having horizontal rows of traveling picking spindles, said roughening device including a post, means at the ends of said post adapted to detachably secure said post to the frame, said roughening device having operative and inoperative positions, a plurality of spaced bolts detachably secured to said post, a sleeve loosely mounted on each bolt, a plate secured to one side of said sleeve, an abrasive affixed to a portion of said plate, said plate being gravity actuated for moving the abrasive portion of the plate into operative position for engaging one spindle at a time, an arm having an end thereof secured to the other side of each of said sleeves, a bar pivotally connected to the other end of each of said arms for moving said plates from operative to inoperative position, and means mountable on said frame and pivotally connected to an end of said bar for retaining said plates in an inoperative position.

JOHN D. RUST.

References Cited in the file of this patent

UNITED STATES PATENTS

| Number | Name | Date |
|---|---|---|
| 2,162,750 | Rust | June 20, 1939 |
| 2,440,450 | Rust | Apr. 27, 1948 |
| 2,485,845 | Rust | Oct. 25, 1949 |